Jan. 26, 1971  G. P. LAMER ETAL  3,558,172
LOAD HANDLING APPARATUS
Filed June 28, 1968  2 Sheets-Sheet 1

Inventors:
Gerald P. Lamer
Elliott S. Burdick
Forrest V. Swanson
By Bair, Freeman & Molinare Attys

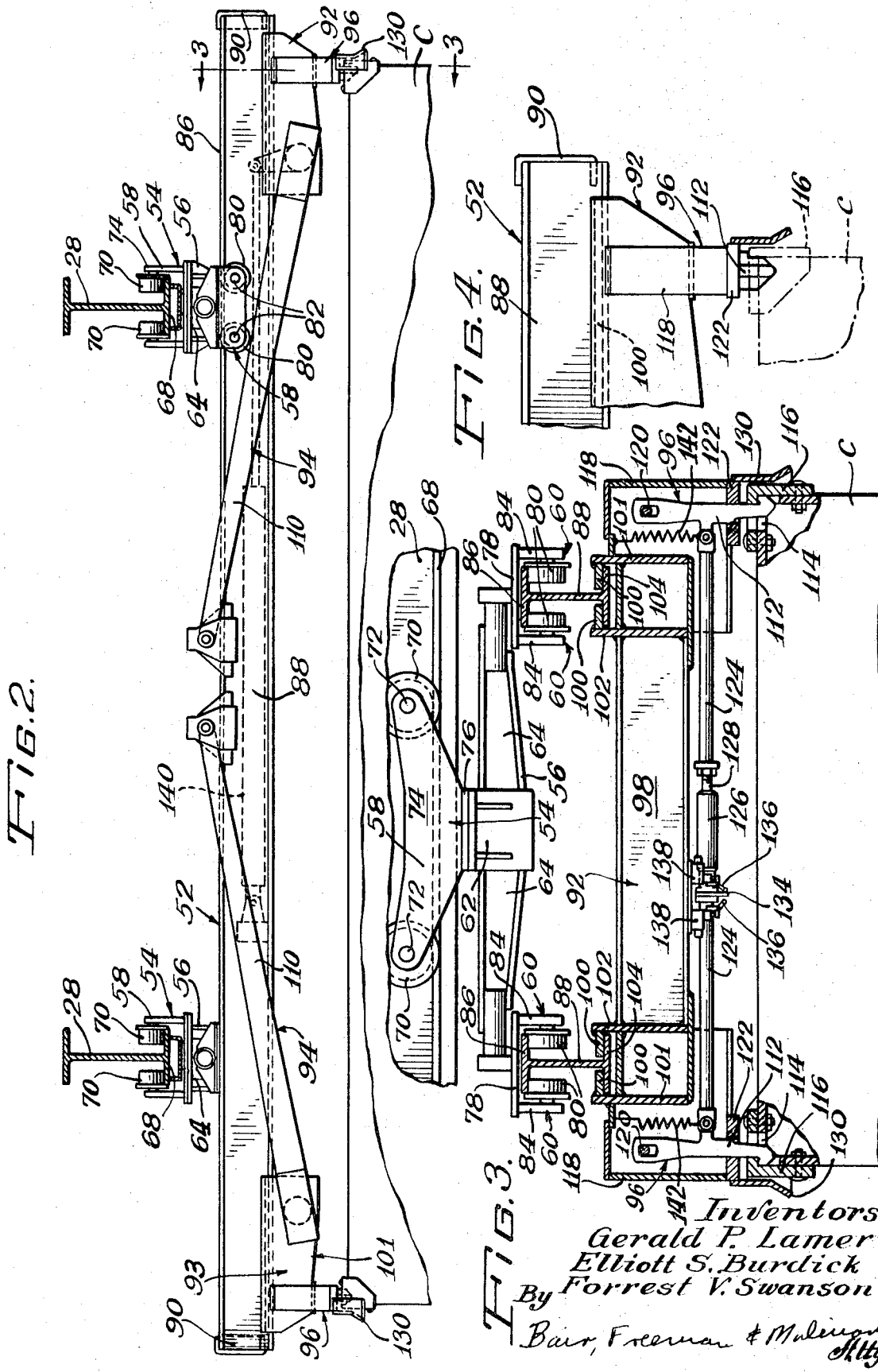

United States Patent Office 3,558,172
Patented Jan. 26, 1971

3,558,172
LOAD HANDLING APPARATUS
Gerald P. Lamer, Rothschild, Elliott S. Burdick, Schofield, and Forrest V. Swanson, Wausau, Wis., assignors to Drott Manufacturing Corporation, a corporation of Wisconsin
Filed June 28, 1968, Ser. No. 740,927
Int. Cl. B60p 1/64
U.S. Cl. 294—67
3 Claims

ABSTRACT OF THE DISCLOSURE

A load handling apparatus for lifting loads either from the bottom or from the top. The apparatus is the type which has a pair of spaced upright inverted U-shaped support frames for straddling a load. A grapple frame is movably carried by the support frames. A pair of movable carriages are mounted on opposite ends of the grapple frame. A pair of arms are swingably mounted on opposite sides of each of the carriages for engaging the underside of a load. A pair of latch members are also mounted at opposite sides of each of the carriages for engaging the top portion of a load. The latch means are inoperative when the arms are operative while the arms are inoperative when the latch means are operative. The mounting of the latch means on the carriage is spaced from the mounting of the arms to the carriage so that the lift arms operate free of the latch means and the latch means operate free of the lift arms.

BACKGROUND OF THE INVENTION

Field of the invention and description of the prior art

This invention relates to a load handling apparatus and it particularly relates to a mobile vehicle having a grapple mounted thereon for lifting large loads, such as piggyback trailers and large cargo containers.

Such mobile vehicles with grapple apparatus thereon have been successfully used for many years for lifting piggyback trailers to and from railway flatcars. Such apparatus is conventionally constructed with first and second pairs of spaced, swingable arms which grasp the trailer from the bottom for the purpose of lifting. The arms are swingable from a horizontal position to a vertical position to the load receiving position and the arms are also swingable towards each other and towards the load to engage and lift a trailer from the bottom. After releasing the load, the arms swing away from each other and then up to a horizontal position to clear the load. Apparatus of this type lifts the load from the bottom because the underside of the trailers are off the ground or from the surface of a railway flatcar, so that the arms can readily grasp the trailer from the bottom. Apparatus of this type is shown, for example, in Lamer et al. U.S. Pat. No. 3,251,496.

In order to lift and transport large, boxlike cargo containers, however, apparatus such as that discussed above cannot be used. These large containers are ordinarily placed directly on a flat surface so that it is not possible for arms to get under the load to lift it from the bottom. As a result, apparatus which is used successfully for lifting piggyback trailers is not useful for lifting large cargo containers.

In order to accomplish the lifting and transporting of such large cargo containers, apparatus of a completely different construction from that used for bottom lifting of truck trailers must be utilized. This different apparatus must lift the container, generally about the same size as trailers, from the top or upper portion of the container. One common structure used for top lifting generally comprises four latches which engage specially designed receiving apertures at the top four corners of the container. The latches enter the container and then are actuated so as to hook onto the lower surface of the metal surrounding the apertures so as to lift the container upwardly.

Thus, according to the practice heretofore, it has been necessary to use two different types of apparatus, both large, complex, and expensive, for lifting trailer truck bodies in one instance and shipping containers in the other instance. When both trailers and the containers must be handled in the same shipping area, it is necessary for the shipping handler to have both types of apparatus, greatly increasing costs.

Summary of the invention

It is therefore an important object of this invention to provide load handling apparatus which is constructed to lift large loads both from the bottom of the load and from the top of the load.

It is also an object of this invention to provide a single load handling apparatus which combines the functions of two separate pieces of equipment heretofore required for lifting large containers, and for lifting truck trailers, by permitting lifting from the bottom and from the top, as required.

It is another object of this invention to provide a single load handling apparatus which combines the functions of lifting large loads either from the top or from the bottom, wherein the construction is particularly characterized by its economy in manufacture, construction, and operation.

It is yet another object of this invention to provide improved load handling apparatus which has swingable arms for lifting large loads from the bottom and it also includes latches for lifting a load from its top portion.

Further purposes and objects of this invention will appear as the specification proceeds.

The foregoing objects are accomplished by our invention by providing a load handling apparatus which includes spaced upright support frames for straddling a load, grapple frame which is movably carried by the support frames, a pair of carriages mounted on opposite ends of the lift frame, a pair of arms for engaging a load, which arms are swingably mounted, at a first position, on opposite sides of the carriage so as to engage the underside of a load, and a pair of latch members mounted, at a second position, on opposite sides of the same carriages for engaging the top portion of a load, said latch members being inoperative when said arms are operative and said arms being inoperative when said latch members are operative, said first and second positions being spaced apart so that the lift arms operate free of said latch means and said latch means operate free of said lift arms.

Brief description of the drawings

A particular embodiment of the present invention is illustrated in the accompanying drawings wherein:

FIG. 2 is an enlarged detailed side elevational view of the grapple frame movably carried by the upright support frames of the load handling apparatus;

FIG. 3 is an enlarged cross-sectional view taken along the line 3—3 of FIG. 2 showing the internal construction of the latch members for lifting containers from the top; and FIG. 4 is a detailed, enlarged side elevational view of a latch member in engagement with one top corner of a container.

Description of the preferred embodiment

Figure 1:
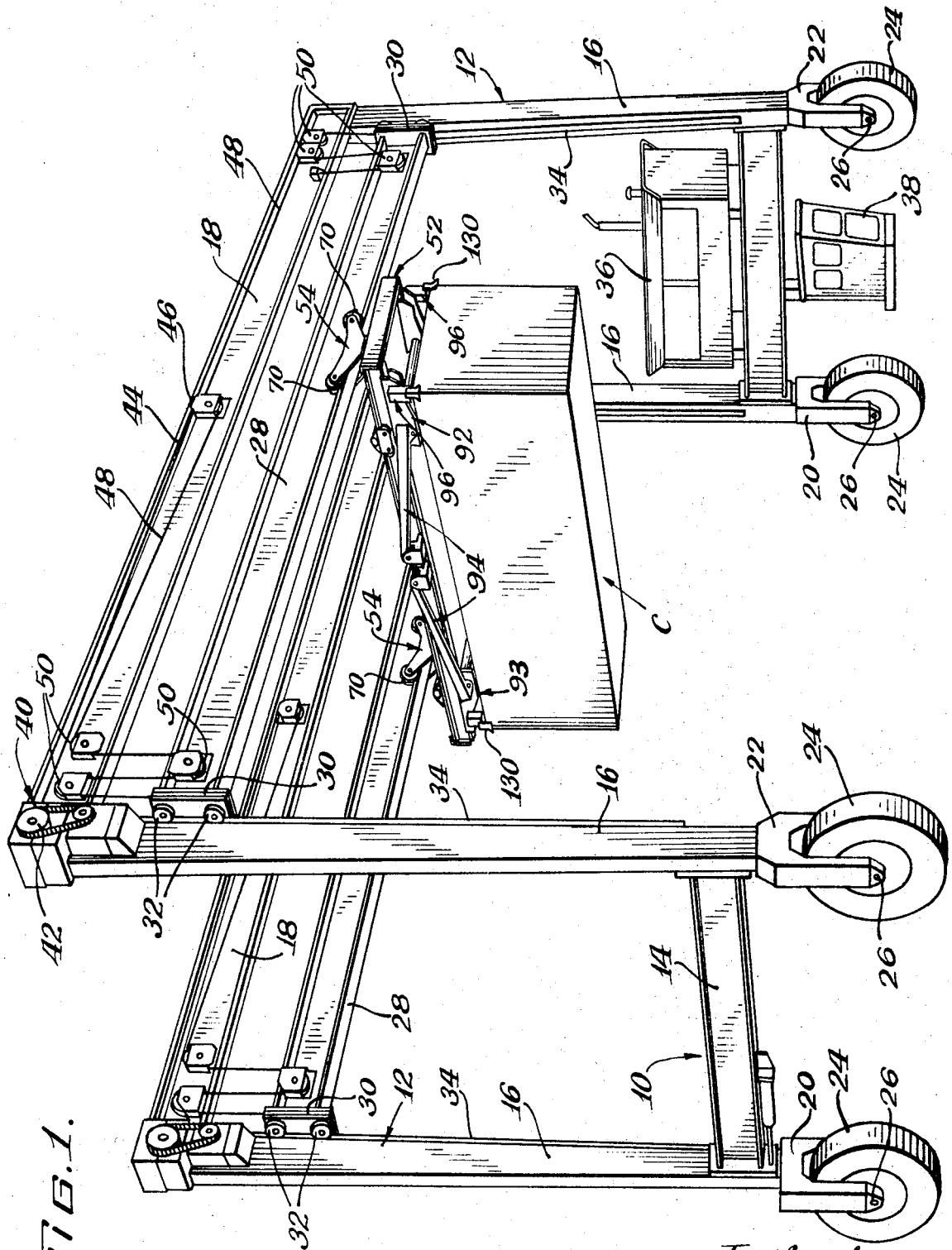
FIG. 1 is a perspective view of our improved apparatus shown with the lift arms in the inoperative position while the latch members are operative and lifting a large boxlike cargo container.

Referring to the drawings, particularly FIG. 1, our improved load handling apparatus, generally 10, includes a pair of generally parallel upright, inverted U-shaped frames 12. The frames 12 are rigidly spaced and secured at their lower portions by a pair of horizontal support rails 14.

Each of the frames 12 includes a pair of spaced upright rigid legs 16 and a top cross beam 18 rigidly joining the upper ends of the upright legs 16. The lower ends of the rear pair of legs 16 include fixed wheel receiving supports 20 and the front pair of legs 16 include wheel supports 22 which are pivotable about a vertical axis which is coextensive with the upright axes of the forward legs 16. The pivoting front wheel supports 22 enable the apparatus 10 to turn in a desired direction, while pivoting about one of the fixed rear wheels 20. Each of the wheel supports 20 and 22 rotatably carry wheels 24 on axles 26 so that the appartus 10 may traverse along a horizontal surface.

One of the side rails of the apparatus 10 supports drive appartus, generally 36, on its upper side and a cab 38 for an operator on its underside. The drive assembly 36 generally comprises a diesel engine (not shown) which operates several drive means, such as electrical motors (not shown) or hydraulic pumps (not shown) for effecting the various necessary movements of the apparatus 10. The drive assembly 36, through various motors or pumps, drives the wheels 24, rotates the wheel pivotable support 22, raises and lowers the stabilizing beams 28, raises and lowers the lift arms, operates the top latches, and generally enables the apparatus to perform its necessary functions.

A pair of rigid horizontally positioned stabilizing beams 28 are carried in a vertical direction by each frame 12. Each stabilizing beam 28 includes end support plates 30 and four guide wheels 32 which are rotatably carried on each of the support plates 30. The guide wheels 32 are positioned on opposite sides of and engage an upright guide plate 34 mounted along the inner face of each of the upright legs 16. The stabilizing beams 28 extend between the opposite legs 16 of each of the frames 12.

The stabilizing beams 28 are moved upwardly and downwardly by drive apparatus, generally 40. The lift apparatus 40 includes motor operated winch 42, which drives a cable 44. The cable 44 extends from the drive 42 to the central part of the overhead cross beam 18 where the cable 44 windably engages a pulley 46. The cable 44 drives the pulley 46, which also windably engages a second cable 48 which is connected at its opposite ends to the opposite ends of the stabilizing beam 28. In passing from the central pulley 46, which is fixedly mounted to the top cross beam 18 of each of the frames 12, the cable 48, at each top side, engages a series of sheaves 50, two of which are mounted near the end portions of the cross beam 18 and one of which is mounted near the outer end portion of the stabilizing beam 28. By the described drive apparatus 40, each stabilizing beam 28 is enabled to move up and down while remaining in a substantially horizontal position.

A grappler lift frame, generally 52, is movably carried at its opposite ends by carriages 54 which traverse along the stabilizing beams 28 between the upright legs 16. The legs 16 are spaced sufficiently far apart to permit the grapple frame to move a load from one position to a second position which is completely apart from the first position.

Referring particularly to FIGS. 2 and 3, each of the top carriages 54 comprises a cross frame 56, an upper wheel assembly 58 which is pivotally mounted to the upper central portion of the cross frame 56, and a pair of downwardly extending lower wheel assemblies 60 mounted at opposite ends of the cross frame 56.

Each cross frame 56 generally comprises a central journal member 62 and a pair of laterally extending beams 64 which are rigidly joined to the central journal member 62. The outer ends of one of the beams 64 rigidly carry wheel assembly support frames 66. The other carriage 54 remains fixed on the frame 52.

Each upper wheel assembly 58 engages the lower flange 68 of each stabilizing beam 28 with a pair of wheels 70 mounted on each side of the lower flange 68 so as to provide four wheels 70 engaging the upper surface of the lower flange 68. The wheel assembly thereby acts as a movable hanger for the carriage 54. The wheels 70 are each journalled at 72 to a wheel support bracket 74, which in turn is rigidly secured to a support plate 76. A pivot member (not shown) extends downwardly from the plate 76 and is rotatably received within the journal member 62 so as to provide the desired pivoting between the carriages 54 and the beams, whereby the longitudinal axis of the grapple frame 52 may be offset from the longitudinal axis of the entire apparatus 10.

Each lower wheel assembly 60 is mounted to the underside of a support plate 78. Lower wheels 80 are journalled at 82 to upright wheel support brackets 84 which are supported by and extend downwardly from support plate 78. One pair of wheels 80 is mounted on each side of the upper flange 86 of each of the longitudinal beams 88 of the grapple frame 52. The four wheels 80 all engage the lower surface of the upper flange 86. The carriage assembly 54 thereby movably and pivotally carries the grapple frame 52.

Since the upper wheel assembly 58 is free to pivot relative to the frame 56, and since the lower wheel assemblies 60 are freely movable along the beams 88, the relative longitudinal distance between the carriages 54 may vary. Suitable drive means (not shown) drive the carriages 54 along the beam 28. Thus, although the stabilizing beams 28 do not vary in the distance apart from each other, the distance between the carriages 54 may vary over a relatively wide range. As the distance between the carriages 54 is changed, the longitudinal axis of the grapple frame 52 is moved to an angle which is offset from the longitudinal axis of the entire appartus 10.

The grapple frame 52 includes the spaced side beams 88, a pair of rigid end beams 90 which rigidly join the side beams 88 together at their opposite ends. The end beams 90 and side beams 88 generally form a rigid overhead rectangular support structure. Intermediate cross beams (not shown) may extend between the inner face of each of the side beams 88 in order to provide added rigidity to the structure.

A slidably movable support carriage 92 is mounted on one end of the grapple frame 52 and another, similarly constructed, slidable frame 93 is mounted at the other end of the frame 52. This structure provides support both for the swingable lift arms 94 which provide for bottom lifting of a load and it also provides support for the latch members 96 which provide for top lifting of a load.

As shown best in FIG. 3, the support carriage 92 (and 93) includes a central beam 98 which rigidly interconnects the flange or rail engaging portions of the carriage. The rail engaging portions each comprise a rigid housing 101 having a rigid bottom wall, side walls, and a top portion 102. The top portion 102 comprises a pair of inwardly extending flanges 100 which slidably engage the upper surfaces of the lower flanges 104 of the side beams 88 of the grapple frame 52. The slidable engagement between the flanges 104 and the flange 106 enables the carriage 92 to readily traverse along the length of the grapple frame 52. The traversing of the carriage 92 permits the distance between the lift arms 94 or the distance between the latch members 96 to be adjusted to the length of the load which is to be lifted. The movement of the carriage 92 is accomplished by an elongated hydraulic cylinder 140 which is secured to the grapple frame 52. The cylinder 140, upon actuation by suitable means, drives the carriage 92. Cables (not shown) are fixed to the frame 92 and are rigged by suitable means, such as pulleys (not shown), to the frame 93 so that the frame 93 and the frame 92 are moved to or away from each other an equal distance.

The lift arms 94 are swingable from a substantially vertical, load position to a substantially horizontal, inoperative position, shown in FIG. 2. In the operative position, the arms 94 extend in a vertically extending downward position. The arms of each pair are swingable towards and away from each other so as to release or grasp a load from the underside thereof by the use of the inwardly extending flanged load receiving member 108. The receiving members 108 are pivotally carried at the lower ends of the arms 110 whose upper ends are pivotally carried by the support carriage 92 and frame 93 to permit the swinging thereof up and down and towards and away from each other. The mounting structure and drive means for the lift arms 110 will not be described in great detail and reference is made to the prior Pat. No. 3,251,496 for more details.

In the operative position, in order to pick up a load, the arms 94 are pivoted downwardly from the horizontal position to a substantially vertical position. One arm from each pair is positioned on opposite sides of the load to be lifted. The arms of each pair are then swung inwardly towards each other by suitable drive means (not shown) so that the load receiving members 108 engage the underside of a load. The grapple frame 52 is then raised upwardly by operation of the drive assembly 40 which raises the stabilizing beams 28. The load is then moved to the desired location and is lowered. When the load reaches the ground, the arms 94 are swung outwardly away from each other and thereby away from the load. The arms are again swung from the vertical position to the horizontal position so that the frame may clear the load.

One important feature of the present invention is the structure for mounting the latch members 96 to the very same carriage 92 or frame 93 which carries the lift arms 94. The latch members 96 are advantageously of the same structure as used in the prior art for lifting cargo containers from their top portions.

The latch members are positioned outwardly of the position of attachment of the lift arms 94 to the carriage 92 or frame 93. The latch members 96, as shown, extend vertically downwardly from the carriage 92 and frame 93 and from the grapple frame 52 so that the latch hook elements 112 may be inserted directly into apertures 114 defined at the four corners of the container C. The apertures 114 are conveniently formed in corner castings 116 which are rigidly bolted to the corners of the container C. Each hook element 112 is passed through each of the apertures 114 so as to engage the underside of the castings 116, as shown in FIG. 3.

The latch elements are contained within housings 118 which are outwardly of the rail housings 101 on the carriage 92 and frame 93. The latch elements 112 are pivotally carried about horizontal axes, parallel with the axis of the frame 52, by pin members 120 which are mounted within the housings 118. The latches 112 extend downwardly through apertures provided in latch housing plates 122 formed in the bottom of the housings 118, the apertures limit the angular movement of the hook elements 112 and also lock the enlarged portions of the latches 112 against lateral movement.

Inwardly facing intermediate portions of the latch elements 112 are each pivotally connected to a rod member 124. The inner ends of the rods 124 are pivoted to a hydraulic drive cylinder member 126.

The hydraulic cylinder 126 includes a pair of piston members (not shown) at its opposite ends. Piston rods 128 extend from the cylinder 126 and are pivotally joined to each of the rod members 124 so as to link the latch hook elements 112 to the drive cylinder 126. Since the width of the container C is normally fixed, the transverse spacing between the latch elements 112 is relatively fixed. However, the longitudinal spacing between the latch elements may be varied so as to adjust the spacing of each latch pair to the desired amount, whereby the four corners of the container C are engaged by the four hook elements 112.

It is important to provide rigid corner guide members 130 adjacent the hook elements 112 so as to guide the latch hook elements 112 into engagement with the apertures 114 in the corner castings 116. The guide elements 130 comprise downwardly extending corner flanges which are secured to the outer corners of the housing 118 and spaced slightly outwardly therefrom.

The hydraulic drive cylinder 126, upon actuation in the latching direction, moves a trip member 134 which is rigidly secured to one of the movable rods 124 or 126. The trip element 134 is aligned with a switch arm 136 which is operatively connected to limit switches 138. The two limit switches 138 operate indicator lights in the cab 38.

When the latches 112 and load are raised, the enlarged portion of the latch is pulled down into engagement with the apertures in the housing plate 12, to thereby lock the latches in place. After the load is released, the springs 142 pull the latches 112 upwardly to disengage them from the plates 122 and thereby from the corner castings 116.

While it is believed that operation of the apparatus 10 is apparent from the foregoing description, a detailed description of the operation will be provided. When the apparatus 10 is used for lifting a trailer, for example, from a railway flatcar, the apparatus 10 straddles the load and the railway flatcar. The stabilizing beams 28 are lowered by the drive apparatus 40, which thereby lowers the grapple frame 52 and the lift arms 94. Where the lift arms 94 are in the horizontal, inoperative position, generally as shown in FIG. 2, they must be swung by drive means (not shown) from such position to an upright position, with one arm of each pair on opposite sides of the load. The arms are then swung or moved inwardly by suitable drive means (not shown) towards each other so that the load receiving members 108 engage the load from the bottom. The load is then raised with the stabilizing beams 28. The frame carriages 54 are traversed along the stabilizing beams 28 until the load is at the unloading position.

The beams 28 are then lowered until the trailer reaches the ground where it is released. The arms 94 of each pair are swung outwardly away from each other so as to become disengaged from the load so that the arms are again swung upwardly to the horizontal position. It is important that during the entire cycle of operations the latch members 96 are inoperative and interfere in no way with the operation of the bottom engaging lift arms.

The operation of the latching elements 96 for lifting the container C is somewhat similar to that of the lifting of a piggyback trailer. However, during the operation of the latch elements 96, the lift arms must be inoperative, and are to remain in the horizontal position, spaced upwardly and inwardly away from the latch elements 96.

With the arms 94 in the inoperative, horizontal position, the drive cylinder 140 adjusts the longitudinal spacing between carriage 92 and frame 93 so that the latch elements are adjusted to engage a container C of a given length.

The frame 52 is lowered until the latching elements engage the apertures 114 in the corner castings 116. The guide members 130 at the corners of the housings 118 engage the outer edges of the corner castings 116 on the container C so as to stabilize the lowering movement and guide the latch elements 96 into engagement with the apertures 114. When the latching elements are fully extended into the apertures, the drive cylinder 126 is actuated so as to drive the rods 124 and 128 outwardly and thereby pivot the latch elements 112 into positive engagement with the under surface of the corner castings 116.

The container C is then lifted upwardly, the carriages 54 traverse the stabilizing beam until the place of deposit is reached, and the stabilizing beams 28 are lowered until the load reaches the ground. When the load reaches the ground, the operator again operates the drive cylinder 126, moving the rods 124 inwardly and the latches 112 are disengaged from the corner castings 116. The stabilizing beams are raised and the hook elements 112 are moved out of the apertures 114 in the corner castings 116.

From the foregoing, it is seen that all of the objects of the present invention have been accomplished. We have provided a structure which will lift large loads either from the bottom or from the top. The structure effectively combines the operations of two large pieces of equipment into a single apparatus for accomplishing two different functions. These results are achieved in a highly economical and simple manner by the described invention.

While in the foregoing, there has been provided a detailed description of a particular embodiment of the present invention, it is to be understood that all equivalents obvious to those having skill in the art are to be included within the scope of the invention as claimed.

What we claim and desire to secure by Letters Patent is:

1. Load handling apparatus comprising a pair of spaced upright support frames and top connecting cross-members for straddling a load, a pair of stabilizing beams vertically movable on the upright supports and a grapple frame carried by said stabilizing beams, a pair of frame means mounted on opposite ends of said grapple frame, a pair of lift arms for engaging a load swingably mounted at a first position on opposite sides of each of said frame means for engaging the underside of a load, a pair of load lifting latch means mounted at a second position adjacent said arms on opposite sides of each of said frame means for engaging the upper portion of a load, said frame means each including a support member at each end for supporting both one of said arms and one of said latch means and means mounted adjacent said latch means on said carriage for guiding said latch means into engagement with a load said latch means being inoperative when said arms are operative and said arms being swung to an inoperative position over the load when said latch means are operative, said first and second positions being longitudinally spaced apart on said support members, said first position being inwardly and upwardly of said second position so that said lift arms operate free of said latch means and said latch means operate free of said lift arms.

2. The apparatus of claim 1 wherein apertures are defined in the top of a load and said latch means comprise downwardly extending laterally movable latch members for engagement with said apertures.

3. The apparatus of claim 1 wherein each pair of said latch means are at a relatively fixed lateral spacing, and each pair are movable in a longitudinal direction away from each other so that the distance between each of said pairs is longitudinally adjustable.

References Cited

UNITED STATES PATENTS

| 3,078,115 | 2/1963 | Harlander et al. | 294—67(4A) |
| 3,176,866 | 4/1965 | Meister, Jr. | 294—67(4A) |
| 3,251,496 | 5/1966 | Lamer et al. | 214—392 |

ALBERT J. MAKAY, Primary Examiner

U.S. Cl. X.R.

212—14; 214—392